(12) United States Patent
Lee et al.

(10) Patent No.: US 12,523,566 B2
(45) Date of Patent: Jan. 13, 2026

(54) OPTICAL MEASUREMENT APPARATUS

(71) Applicant: Samsung Electronics Co., Ltd., Suwon-si (KR)

(72) Inventors: Seung Ryeol Lee, Suwon-si (KR); Ye Eun Park, Suwon-si (KR); Jin Woo Ahn, Suwon-si (KR); Seung Woo Lee, Suwon-si (KR); Tae Joong Kim, Suwon-si (KR); Myung Jun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 18/402,505

(22) Filed: Jan. 2, 2024

(65) Prior Publication Data
US 2024/0280435 A1    Aug. 22, 2024

(30) Foreign Application Priority Data
Feb. 16, 2023    (KR) .......................... 10-2023-0020878

(51) Int. Cl.
*G01M 11/02* (2006.01)
*G01N 21/21* (2006.01)
*G01N 21/88* (2006.01)

(52) U.S. Cl.
CPC .... *G01M 11/0257* (2013.01); *G01M 11/0207* (2013.01); *G01M 11/0242* (2013.01);
(Continued)

(58) Field of Classification Search
CPC .... G01M 11/00; G01M 11/005; G01M 11/02; G01M 11/0207; G01M 11/0214;
(Continued)

(56) References Cited

U.S. PATENT DOCUMENTS 4,241,996 A * 12/1980 Weiser ............... G01M 11/0292
356/124.5
7,106,452 B2 * 9/2006 Ouchi ................ G01M 11/0271
356/495

(Continued)

FOREIGN PATENT DOCUMENTS

CN    102564731 A  *  7/2012
CN    106248351 A  * 12/2016 ............ G01M 11/00
(Continued)

OTHER PUBLICATIONS

F. Lei and L. K. Dang, "Measurement of the numerical aperture and f-number of a lens system by using a phase grating," Appl. Opt. 32, 5689-5691 (1993).
(Continued)

*Primary Examiner* — Gordon J Stock, Jr.
(74) *Attorney, Agent, or Firm* — Muir Patent Law, PLLC

(57) ABSTRACT

Provided is an optical measurement apparatus. The optical measurement apparatus includes a light source; an objective lens; a reflector configured to change an optical path of light emitted from the light source such that the light is directed toward the objective lens; a detector configured to detect a pupil image; a first adjuster configured to rotate the light source around the reflector; and a second adjuster configured to rotate the reflector.

20 Claims, 12 Drawing Sheets

(52) U.S. Cl.
CPC ......... *G01N 21/21* (2013.01); *G01N 21/8806* (2013.01); *G01N 2021/8845* (2013.01); *G01N 2021/8848* (2013.01)

(58) Field of Classification Search
CPC ......... G01M 11/0221; G01M 11/0235; G01M 11/0228; G01M 11/0242; G01M 11/025; G01M 11/0257; G01M 11/0271; G01M 11/0278; G01M 11/0285; G01M 11/0292; G01M 11/04; G01N 21/21; G01N 21/23; G01N 21/8803; G01N 21/8806; G01N 21/958; G01N 2021/8835; G01N 2021/8845; G01N 2021/8848; G01N 2021/9511; G01N 2021/9583
See application file for complete search history.

(56) References Cited

U.S. PATENT DOCUMENTS

| | | | |
|---|---|---|---|
| 7,286,245 B2 | 10/2007 | Wegmann et al. | |
| 8,593,623 B2 * | 11/2013 | Levecq | G01M 11/0257 356/125 |
| 8,797,520 B2 | 8/2014 | Negishi | |
| 8,823,926 B2 * | 9/2014 | Hanssen | G01M 11/081 356/124 |
| 8,908,191 B2 * | 12/2014 | Tschudi | G01M 11/025 356/515 |
| 9,274,440 B2 | 3/2016 | Hempelmann et al. | |
| 10,732,336 B2 * | 8/2020 | Dewa | G02B 5/3083 |
| 11,029,206 B2 * | 6/2021 | Fu | G01M 11/0207 |
| 2010/0283999 A1 * | 11/2010 | Takeyama | G01N 21/958 356/239.2 |
| 2018/0238687 A1 * | 8/2018 | Gächter Toya | G01S 7/4817 |
| 2020/0088510 A1 * | 3/2020 | Okuyama | G02F 1/13363 |
| 2021/0364929 A1 | 11/2021 | Hsu et al. | |

FOREIGN PATENT DOCUMENTS

| | | | | |
|---|---|---|---|---|
| CN | 108871579 A | | 11/2018 | |
| CN | 110764372 A | | 2/2020 | |
| CN | 204008076 U | * | 12/2021 | |
| CN | 115046736 A | * | 9/2022 | ........ G01M 11/0207 |
| CN | 116577075 A | * | 8/2023 | ........ G01M 11/0257 |
| JP | 2010093055 A | | 4/2010 | |
| JP | 2012033661 A | | 2/2012 | |
| KR | 101525352 B1 | * | 6/2015 | ........... A61B 3/0075 |
| WO | WO-2006037222 A1 | * | 4/2006 | ........... G02B 21/367 |

OTHER PUBLICATIONS

Jin-Seok Lee, Ho-Soon Yang, and Jae-Won Hahn, "Wavefront error measurement of high-numerical-aperture optics with a Shack-Hartmann sensor and a point source," Appl. Opt. 46, 1411-1415 (2007).

* cited by examiner

OPTICAL MEASUREMENT APPARATUS

CROSS-REFERENCE TO RELATED APPLICATION

This application claims priority to Korean Patent Application No. 10-2023-0020878 filed on Feb. 16, 2022, in the Korean Intellectual Property Office, and all the benefits accruing therefrom under 35 U.S.C. 119, the contents of which in their entirety are herein incorporated by reference.

BACKGROUND

Field

The present disclosure relates to an optical measurement apparatus.

Description of Related Art

As integration of semiconductor devices increases and semiconductor patterns become finer, necessity of introducing high NA (High Numerical Aperture) objective lenses in a lithography apparatus used for semiconductor patterning and in an apparatus for semiconductor inspection or measurement is emerging.

The high NA objective lens is composed of a combination of multiple layers of spherical and aspherical lenses. Thus, it is difficult to manufacture the high NA objective lens. Further, the high NA objective lens is easily affected by various external environments, such as a temperature. Accordingly, as the NA of the high NA objective lens increases, TTTM (Tool to Tool Matching) between objective lenses is more important. Therefore, it is important to understand characteristics of an objective lens before using the high NA objective lens.

SUMMARY

A technical purpose to be achieved by the present disclosure is to provide an optical measurement apparatus capable of measuring a geometric optical aberration and a polarization aberration.

Another technical purpose to be achieved by the present disclosure is to provide an optical measurement apparatus capable of measuring the geometric optical aberration or the polarization aberration with respect to the entire ranges of incident angle, azimuth, wavelength, and polarization of light incident on an objective lens.

The technical purposes of the present disclosure are not limited to the technical purposes mentioned above, and other technical purposes not mentioned will be clearly understood by those skilled in the art from descriptions set forth below.

According to some aspects of the present disclosure, there is provided an optical measurement apparatus including a light source; an objective lens; a reflector configured to change an optical path of light emitted from the light source such that the light is directed toward the objective lens; a detector configured to detect a pupil image; a first adjuster configured to rotate the light source around the reflector; and a second adjuster configured to rotate the reflector.

According to some aspects of the present disclosure, there is provided an optical measurement apparatus including a light source configured to generate light; an objective lens; a reflector configured to reflect light emitted from the light source so as to be directed toward the objective lens; a detector configured to detect a pupil image; a first adjuster configured to adjust an incident angle of the light incident on the objective lens; and a second adjuster configured to adjust an azimuth of the light incident on the objective lens.

According to some aspects of the present disclosure, there is provided an optical measurement apparatus including: a light source; a reflector aligned with the light source in a first direction; an objective lens aligned with the reflector in a second direction intersecting the first direction; and a detector configured to detect a pupil image, wherein the light source is rotatable around the reflector, wherein the reflector is rotatable independently of the light source.

BRIEF DESCRIPTION OF DRAWINGS

The above and other aspects and features of the present disclosure will become more apparent by describing in detail illustrative embodiments thereof with reference to the attached drawings, in which.

DETAILED DESCRIPTIONS

Figure 1:
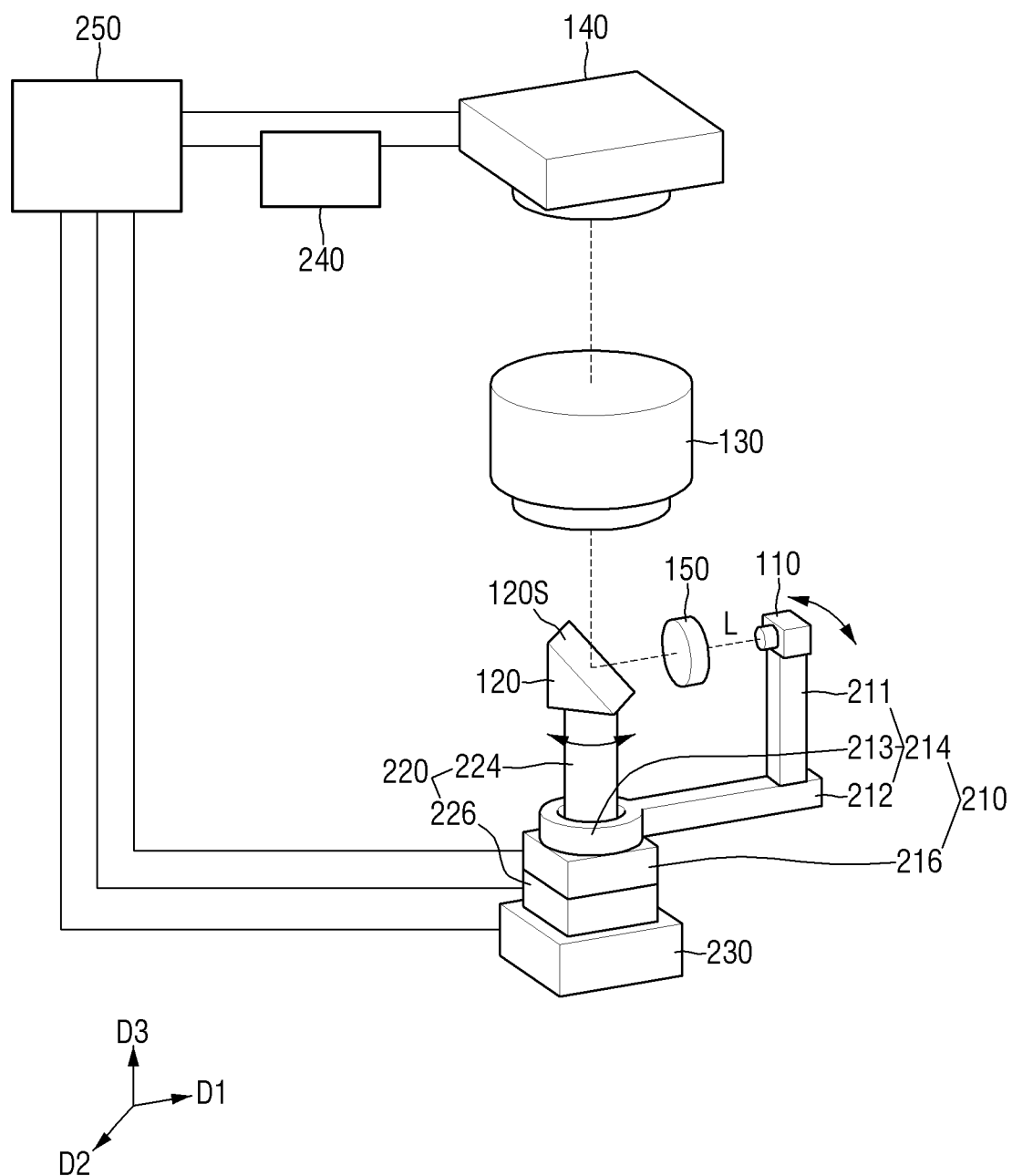
FIG. 1 is a diagram for illustrating an optical measurement apparatus according to some embodiments.

FIG. 1 is a diagram for illustrating an optical measurement apparatus according to some embodiments.

Referring to FIG. 1, the optical measurement apparatus according to some embodiments may include a light source 110, light-path changing means 120, an objective lens 130, a detector 140, a wavelength selector 150, a first adjuster 210, a second adjuster 220, a third adjuster 230, a fourth adjuster 240, and a controller 250.

The light source 110 may generate and output light L.

In some embodiments, the light source 110 may generate and output broadband or multi-wavelength light. The broadband light may be multi-color light including light of a plurality of wavelength bands. The broadband light may have a wide wavelength range, for example, from an ultraviolet wavelength range (e.g., about 100 nm to about 400 nm) to an infrared wavelength range (e.g., about 750 nm to about 1,000 μm). The light source 110 may be, for example, a halogen lamp light source or an LED light source generating continuous spectrum light. However, the present disclosure is not limited thereto.

Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

In some embodiments, the light source 110 may generate and output monochromatic light. The monochrome light may mean light having one wavelength or light having a narrow wavelength range (e.g., light having a wavelength range of several nanometers) represented by one wavelength, e.g., a medium wavelength within the narrow wavelength range.

The light-path changing means 120 may be aligned with the light source 110 on a plane extending in and/or parallel to a first direction D1 and a second direction D2. For example, the first and second directions D1 and D2 may be horizontal directions. For example, the light-path changing means 120 may overlap the light source 110 in a horizontal direction. The light-path changing means 120 may change a path of the light L provided from the light source 110. The light-path changing means 120 may reflect the light L provided from the light source 110 so as to be directed toward the objective lens 130. The light L may be reflected from a reflective surface 120S of the light-path changing means 120. An angle defined between an optical axis (OA in FIG. 2) of the objective lens 130 and the reflective surface 120S may 45 degrees.

Spatially relative terms, such as "beneath," "below," "lower," "above," "upper" and the like, may be used herein for ease of description to describe positional relationships. It will be understood that the spatially relative terms encompass different orientations of the device in addition to the orientation depicted in the figures.

In some embodiments, the light-path changing means 120 may be a 45 degree mirror (e.g., having an angle of 45 degree between a normal line of a reflective surface of the mirror and a vertical line). In some embodiments, the light-path changing means 120 may be a beam splitter. For example, the light-path changing means 120 may be a reflector (e.g., a light reflector) configured to reflect light. For example, the reflector may be a mirror or a beam splitter. The beam splitter may reflect a portion of light incident on the beam splitter and some other portion of light incident on the beam splitter may penetrate the beam splitter.

The objective lens 130 may be aligned with (e.g., overlap) the light-path changing means 120 in a third direction D3. The third direction may be a vertical direction. The light L reflected from the light-path changing means 120 may be incident on the objective lens 130. The light L which has passed through the objective lens 130 may encounter a pupil plane of the objective lens 130.

The detector 140 may be aligned with (e.g., overlap) the objective lens 130 in the third direction D3. The detector 140 may detect a pupil image. The pupil image may be an image on the pupil plane.

The detector 140 may be, for example, a charge coupled device (CCD) camera or a complementary metal oxide semiconductor (CMOS) image sensor. However, the present disclosure is not limited thereto.

The wavelength selector 150 may be disposed between the light source 110 and the detector 140. For example, the wavelength selector 150 may be disposed between the light source 110 and the light-path changing means 120. However, the present disclosure is not limited thereto.

The wavelength selector 150 may output a light beam having a specific wavelength of the light L generated from the light source 110. The wavelength selector 150 may output at least one monochromatic light beam of the broadband light provided from the light source 110. The wavelength selector 150 may output a monochromatic light beam or any number of monochromatic light beams. In some embodiments, the light source 110 may output the monochromatic light beam, and when the light source 110 outputs the monochromatic light beam, the wavelength selector 150 may be omitted.

The wavelength selector 150 may include or may be, for example, a band pass filter.

The first adjuster 210 may adjust an incident angle at which the light L is incident on the objective lens 130. This will be described in detail with reference to FIG. 2 and FIG. 3.

The first adjuster 210 may rotate the light source 110 around the light-path changing means 120. The first adjuster 210 may include a first stage 214 connected to (e.g., mounting) the light source 110 and a first driver 216 connected to the first stage 214. The light source 110 may be disposed on the first stage 214. The first driver 216 may rotate the first stage 214. Accordingly, the light source 110 may rotate around the light-path changing means 120. The light source 110 may rotate around the light-path changing means 120 in a plane extending in and/or parallel to the first direction D1 and the second direction D2. The second direction D2 may intersect the first direction D1. The third direction D3 may intersect the first direction D1 and the second direction D2. For example, the first, second and third directions D1, D2 and D3 may be perpendicular to each other.

The second adjuster 220 may adjust an azimuth of the light L incident on the objective lens 130. This will be described in detail with reference to FIG. 4 and FIG. 5 below.

The second adjuster 220 may rotate the light-path changing means 120. The second adjuster 220 may include a second stage 224 connected to the light-path changing means 120 and a second driver 226 connected to the second stage 224. The light-path changing means 120 may be disposed on the second stage 224. The second driver 226 may rotate the second stage 224, e.g., with respect to a central axis extending in the third direction D3. Accordingly, the light-path changing means 120 may rotate.

For example, the first adjuster 210 may rotate the light source 110 around the optical axis OA of the objective lens 130 as a rotation axis, while the second adjuster 220 may rotate the light-path changing means 120 around the optical axis OA of the objective lens 130 as a rotation axis.

The first adjuster 210 and the second adjuster 220 may operate independently of each other. That is, the light source 110 and the light-path changing means 120 may rotate independently of each other.

Each of the first driver 216 and the second driver 226 may include, for example, a motor. Each of the first driver 216 and the second driver 226 may further include a further rotating element other than the motor.

For example, the second stage 224 may extend (e.g., lengthwise) in the third direction D3. The first stage 214 may include a first portion 211 extending (e.g., lengthwise) in the third direction D3, a second portion 212 connected to the first portion 211 and extending (e.g., lengthwise) in a direction parallel to the plane extending the first direction D1 and the second direction D2, and a third portion 213 connected to the second portion 212 and surrounding the second stage 224, e.g., as a closed loop. The light source 110 may be connected to (e.g., mounted on) the first portion 211. The first portion 211 may be formed such that the light source 110 and the light-path changing means 120 are aligned with each other on the plane extending in and/or parallel to the first direction D1 and the second direction D2.

The light source 110, the first adjuster 210, the light-path changing means 120, and the second adjuster 220 may be disposed, for example, on the third adjuster 230. The third adjuster 230, the second adjuster 220, and the first adjuster 210 may be sequentially stacked, e.g., in the third direction D3 (e.g., to overlap each other in the vertical direction).

The third adjuster 230 may be movable in the third direction D3. Accordingly, the third adjuster 230 may adjust a distance between the light-path changing means 120 and the objective lens 130. The third adjuster 230 may be movable in each of the first direction D1 and the second direction D2. Under an operation of the third adjuster 230, the objective lens 130 and the light-path changing means 120 may be aligned with each other. Under an operation of the third adjuster 230, the optical axis of the objective lens 130 and the rotational axis of the light-path changing means 120 may be aligned with each other (e.g., coincide).

The third adjuster 230 may include, for example, a motor. The third adjuster 230 may further include a further movable element other than the motor.

The fourth adjuster 240 may be connected to the detector 140. The fourth adjuster 240 may be movable in the third direction D3. Accordingly, the fourth adjuster 240 may adjust a distance between the objective lens 130 and the detector 140.

The fourth adjuster 240 may include, for example, a motor. The fourth adjuster 240 may further include a further movable element other than the motor.

The controller 250 may control the optical measurement apparatus. The controller 250 may control a rotation angle of the first adjuster 210, a rotation angle of the second adjuster 220 and a movement amount of the third adjuster 230 in each of the first to third directions D1, D2, and D3, an output wavelength of the selector 150, etc.

The controller 250 may receive the pupil image from the detector 140. The controller 250 may analyze the pupil image. The controller 250 may analyze performance of the objective lens 130 based on the pupil image.

The controller 250 may calculate various aberrations of the objective lens 130. The controller 250 may calculate a geometric optical aberration of the objective lens 130. The geometrical optical aberration may include, for example, uniformity of a numerical aperture, variation in the numerical aperture based on a wavelength, a chromatic aberration, a coma aberration, a location of the pupil plane, etc.

The controller 250 may receive pupil images with respect to various incident angles at which the light L is incident on the objective lens 130, pupil images with respect to various azimuths of the light L incident on the objective lens 130, and pupil images based on various wavelengths of the light L incident on the objective lens 130. The controller 250 may calculate the geometrical optical aberration based on at least one of the pupil images with respect to the incident angles at which the light L is incident on the objective lens 130, the pupil images with respect to the azimuths of the light L incident on the objective lens 130, or the pupil images with respect to the wavelengths incident on the objective lens 130. The wavelength of the light L incident on the objective lens 130 may be selected by the wavelength selector 150.

The controller 250 may be implemented in hardware, firmware, software, or any combination thereof. For example, the controller 250 may be embodied as a computing device such as a workstation computer, a desktop computer, a laptop computer, or a tablet computer. The controller 250 may be embodied as a simple controller, a complex processor such as a microprocessor, CPU, GPU, etc., a processor implemented in software, dedicated hardware or firmware.

Figure 2:
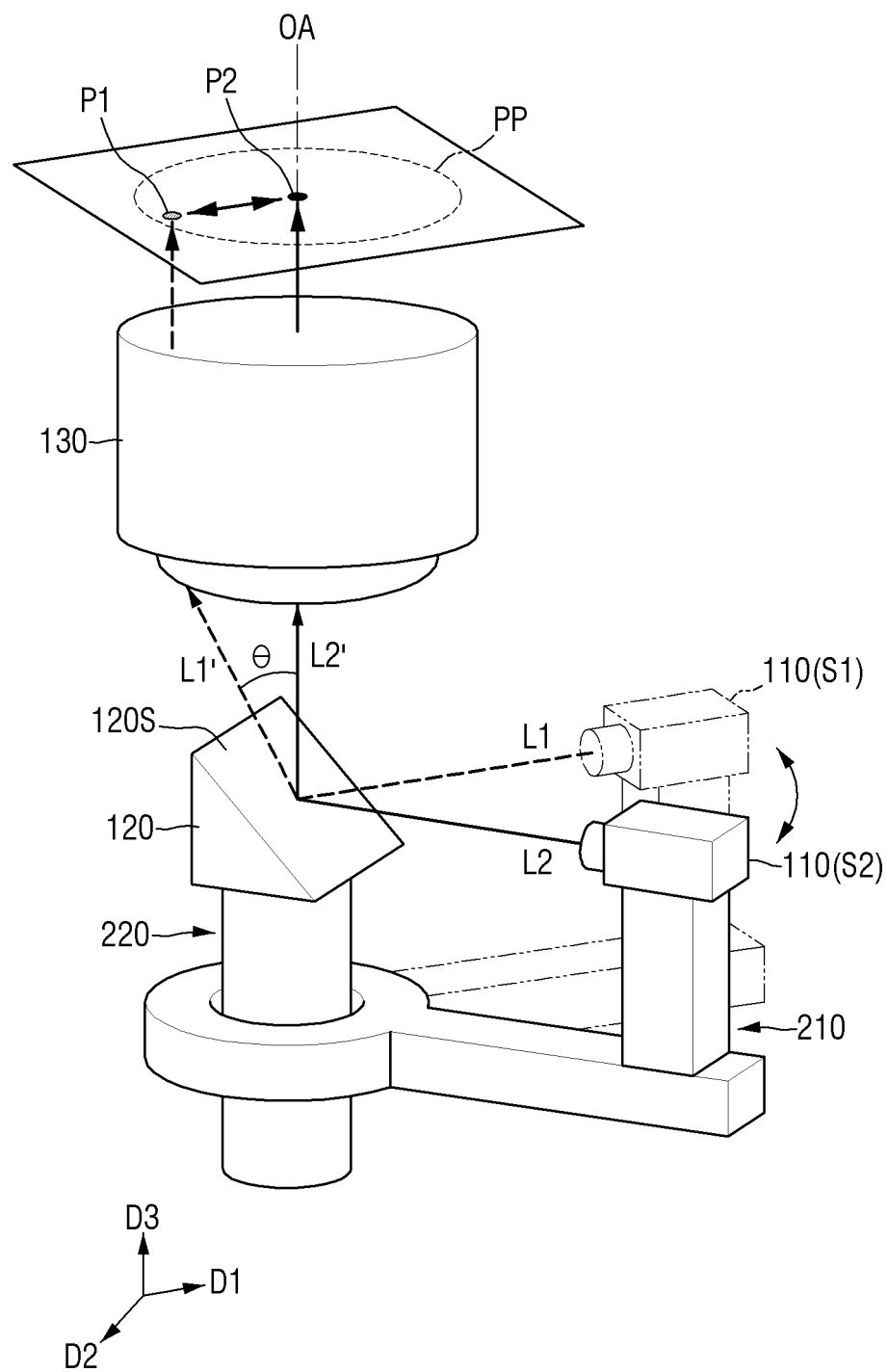
FIG. 2 and FIG. 3 are diagrams for illustrating an operation of a first adjuster in FIG. 1.
Figure 3:
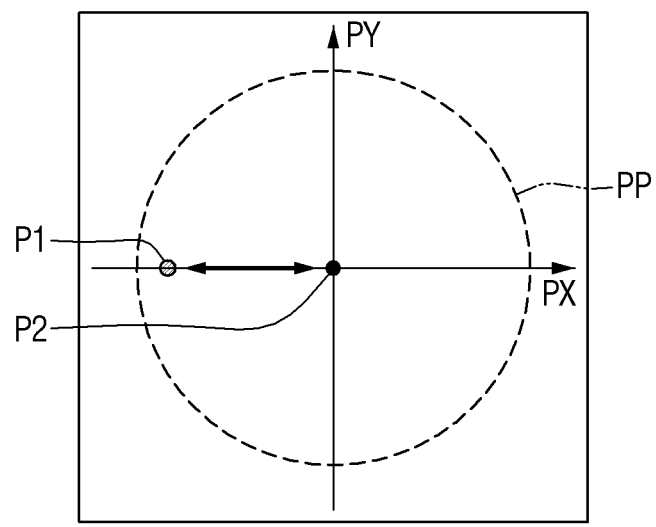

FIG. 2 and FIG. 3 are diagrams for illustrating an operation of the first adjuster in FIG. 1. FIG. 2 is a diagram showing a portion of the optical measurement apparatus of FIG. 1.

Referring to FIG. 2 and FIG. 3, the first adjuster 210 may rotate the light source 110 to adjust an incident angle θ of each of the light beams L1' and L2' incident on the objective lens 130. The incident angle θ of each of the light beams L1' and L2' incident on the objective lens 130 may refer to an angle defined between the optical axis OA of the objective lens 130 and each of the light beams L1' and L2' incident on the objective lens 130.

For example, when the light source 110 is at a first position in S1, a light beam L1 emitted from the light source 110 may be incident on and reflected from the reflective surface 120S of the light-path changing means 120, and then, the light beam L1' reflected from the reflective surface 120S may be incident on the objective lens 130 and encounter a first point P1 of the pupil plane PP. When the light source 110 rotates so as to be at a second position in S2 while the light-path changing means 120 is not rotated but fixed, a light beam L2 emitted from the light source 110 may be incident on and reflected from the reflective surface 120S of the light-path changing means 120, and then the light beam L2' reflected from the reflective surface 120S may be incident on the objective lens 130 and encounter a second point P2 of the pupil plane PP.

When the light source 110 rotates, the azimuth of each of the light beams L1 and L2 incident on the reflective surface 120S of the light-path changing means 120 may be changed. Thus, the incident angle θ of each of the light beams L1' and L2' incident on the objective lens 130 may be changed. The azimuth of each of the light beams L1 and L2 incident on the reflective surface 120S may refer to an angle defined between a reference point on the plane extending in and/or parallel to the first direction D1 and the second direction D2 and each of the light beams L1 and L2.

The optical measurement apparatus according to some embodiments may rotate the light source 110 around the light-path changing means 120 (e.g., a central axis of the light-path changing means extending in the third direction as a rotation axis) so as to detect the pupil image with respect to an entire range of the incident angle θ of each of the light beams L1' and L2' incident on the objective lens 130.

Figure 4:
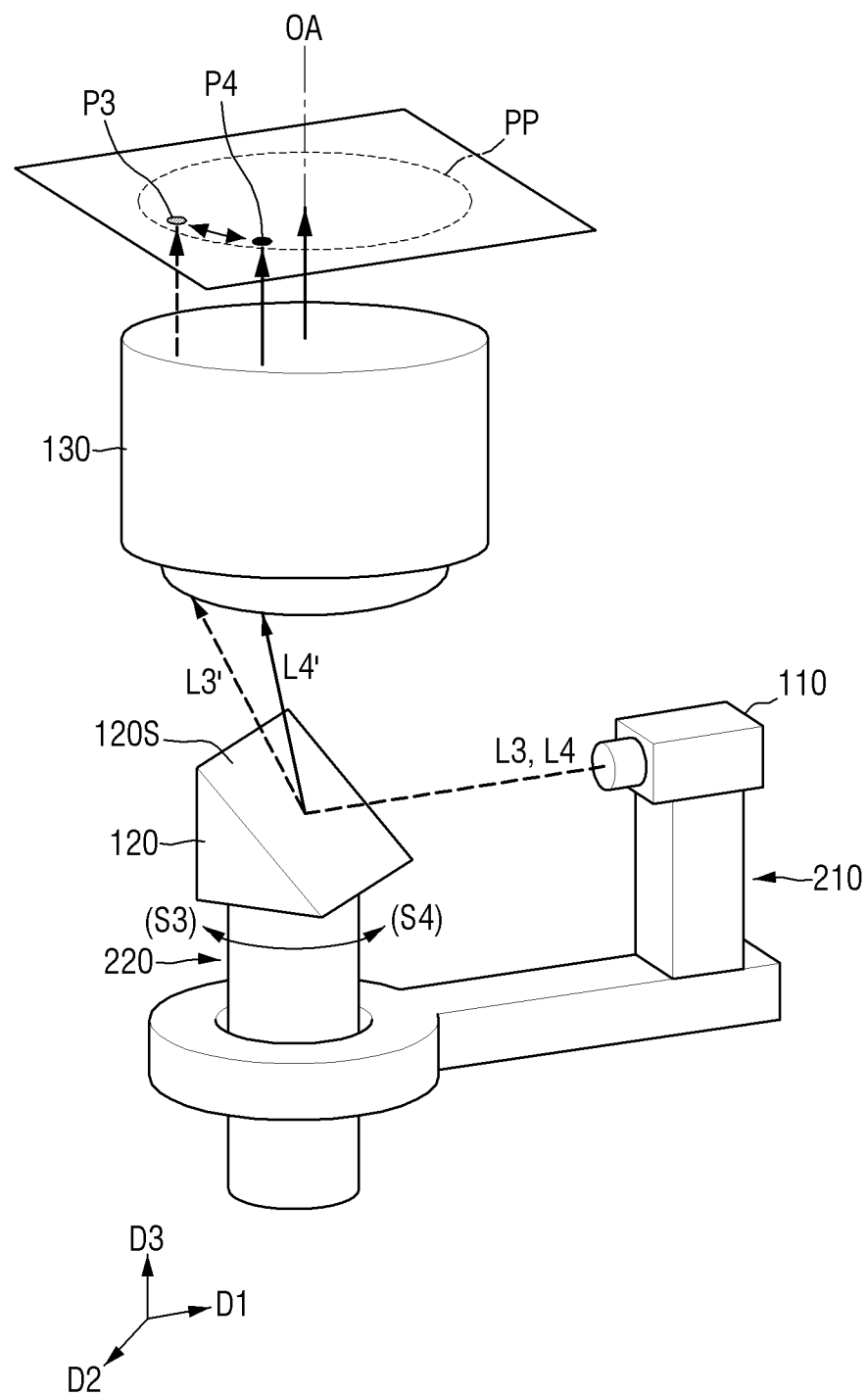
FIG. 4 and FIG. 5 are diagrams for illustrating an operation of a second adjuster in FIG. 1.
Figure 5:
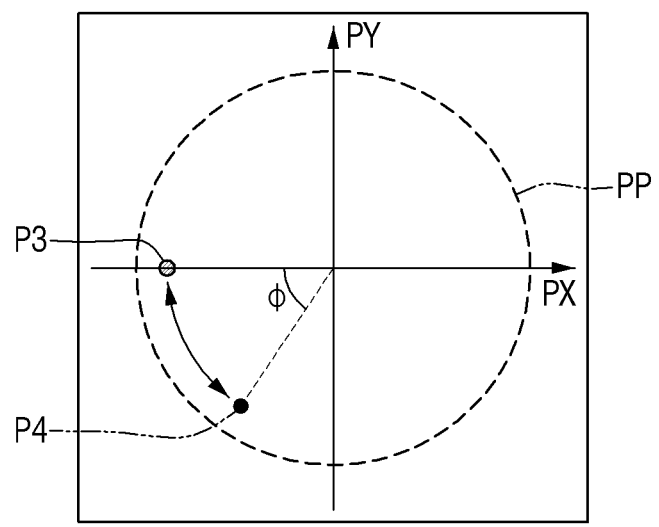

FIG. 4 and FIG. 5 are diagrams for illustrating an operation of the second adjuster in FIG. 1. FIG. 4 is a diagram showing a portion of the optical measurement apparatus of FIG. 1.

Referring to FIG. 4 and FIG. 5, the second adjuster 220 may rotate the light-path changing means 120 to change an azimuth Φ of each of each of the light beams L3' and L4' incident on the objective lens 130. In this regard, the azimuth Φ may refer to an angle defined between a reference point (for example, a third point P3) on the pupil plane PP and another point (for example, a fourth point P4) on the pupil plane PP around the optical axis OA of the objective lens 130.

For example, when the light-path changing means 120 is at a third position in S3, a light beam L3 emitted from the light source 110 may be reflected from the reflective surface 120S of the light-path changing means 120, and then, the light beam L3' reflected from the reflective surface 120S may be incident on the objective lens 130 and encounter the third point P3 of the pupil plane PP. When the light-path changing means 120 rotates so as to be at a fourth position in S4 while the light source 110 does not rotate and is fixed, a light beam L4 emitted from the light source 110 may be reflected from the reflective surface 120S of the light-path changing means 120, and then the light beam L4' reflected from the reflective surface 120S may be incident on the objective lens 130 and encounter the fourth point P4 of the pupil plane PP.

When the light-path changing means 120 rotates, the incident angle of each of the light beams L3 and L4 incident on the reflective surface 120S of the light-path changing means 120 may be changed, and thus the azimuth Φ of each of the light beams L3' and L4' incident on the objective lens 130 may be changed. The incident angle at which each of the light beams L3 and L4 is incident on the reflective surface 120S may refer to an angle defined between a normal line perpendicular to the reflective surface 120S and each of the light beams L3 and L4.

The optical measurement apparatus according to some embodiments may rotate the light-path changing means 120 around a central axis of the light-path changing means 120 as a rotation axis so as to detect the pupil image with respect to an entire range of the azimuth Φ of each of the light beams L3' and L4' incident on the objective lens 130.

The optical measurement apparatus according to some embodiments may detect the pupil image with respect to an entire range of each of the incident angles θ, the azimuths Φ, and the wavelength of each of the light beams L3' and L4' incident on the objective lens 130, thereby achieving mapping of an entire area of the objective lens 130 and achieving more precise measurement of the geometrical optical aberration than prior art apparatus. In addition, the light source 110 and the light-path changing means 120 can operate independently of each other in the plane extending in the first direction D1 and the second direction D2, such that the optical measurement apparatus may be compact, and the incident angle and the azimuth may be adjusted precisely while not being subjected to influence of the gravity.

Figure 6:
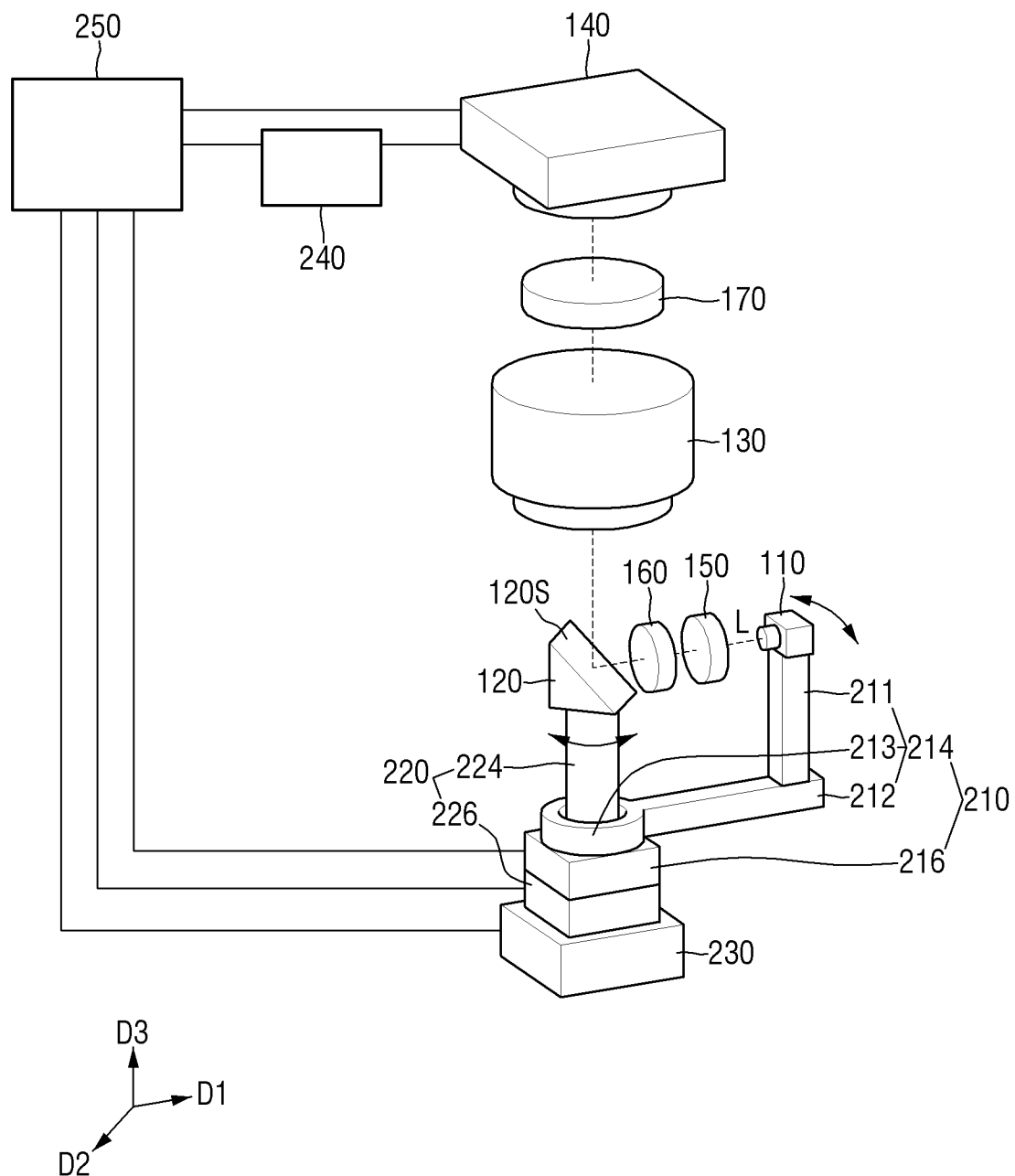
FIG. 6 is a diagram for illustrating an optical measurement apparatus according to some embodiments.

FIG. 6 is a diagram for illustrating an optical measurement apparatus according to some embodiments. For the convenience of description, following description is based on differences thereof from the description as set forth above with reference to FIG. 1.

Referring to FIG. 6, the optical measurement apparatus according to some embodiments may include the light source 110, the light-path changing means 120, the objective lens 130, the detector 140, the wavelength selector 150, a polarization state generator 160, a polarization state analyzer 170, the first adjuster 210, the second adjuster 220, the third adjuster 230 and the controller 250.

The polarization state generator 160 may be disposed between the light source 110 and the light-path changing means 120. For example, the polarization state generator 160 may be disposed between the wavelength selector 150 and the light-path changing means 120. However, the present disclosure is not limited thereto.

The polarization state generator 160 may adjust a polarization state of the light L incident on the objective lens 130. The polarization state may include various polarization states such as linear polarization, circular polarization, and elliptical polarization. The polarization state generator 160 may include one or more of various optical elements. The polarization state generator 160 may include at least one of a polarizer and a phase retarder. For example, the polarization state of the light L incident on the objective lens 130 may be adjusted according to the rotation of the polarization state generator 160.

The polarization state analyzer 170 may be disposed between the objective lens 130 and the detector 140.

The polarization state analyzer 170 may analyze the polarization state of the light L which has passed through the objective lens 130. The polarization state analyzer 170 may be composed of one or more of various optical elements. The polarization state analyzer 170 may include at least one of a polarizer and a phase retarder. For example, according to the rotation of the polarization state analyzer 170, the polarization state of the light L which has passed through the objective lens 130 may be analyzed.

The controller 250 may calculate a polarization aberration of the objective lens 130. The polarization aberration may be, for example, an ellipsometry error based on each of a transmittance, the incident angle, and the azimuth in the pupil plane.

The controller 250 may receive the pupil image with respect to the incident angle θ of each of the light beams L1' and L2' incident on the objective lens 130, the pupil image with respect to the azimuth Φ of each of the light beams L1' and L2' incident on the objective lens 130, the pupil image with respect to the polarization of each of the light beams L1' and L2' incident on the objective lens 130, and the pupil image with respect to the wavelength of each of the light beams L1' and L2' incident on the objective lens 130. The controller 250 may calculate the polarization aberration based on at least one of the pupil image with respect to the incident angle θ of each of the light beams L1' and L2' incident on the objective lens 130, the pupil image with respect to the azimuth Φ of each of the light beams L1' and L2' incident on the objective lens 130, the pupil image with respect to the polarization of each of the light beams L1' and L2' incident on the objective lens 130, and/or the pupil image with respect to the wavelength of each of the light beams L1' and L2' incident on the objective lens 130. The wavelength of each of the light beams L1' and L2' incident on the objective lens 130 may be selected by the wavelength selector 150. The polarization of each of the light beams L1' and L2' incident on the objective lens 130 may be selected by the polarization state generator 160.

The optical measurement apparatus according to some embodiments measures pupil images with respect to an entire range of each of the incident angles θ, the azimuths Φ, the wavelength, and the polarization of each of the light beams L1' and L2' incident on the objective lens 130, thereby achieving a polarization map with respect to an entire area of the objective lens 130 and achieving more precise measurement of the polarization aberration than prior apparatus.

Further, the optical measurement apparatus according to some embodiments can measure both the geometric optical aberration and the polarization aberration. Since the geometrical optical aberration and the polarization aberration may be measured using one apparatus, an apparatus setup time may be reduced. Therefore, the geometric optical aberration and the polarization aberration may be measured quickly.

Figure 7:
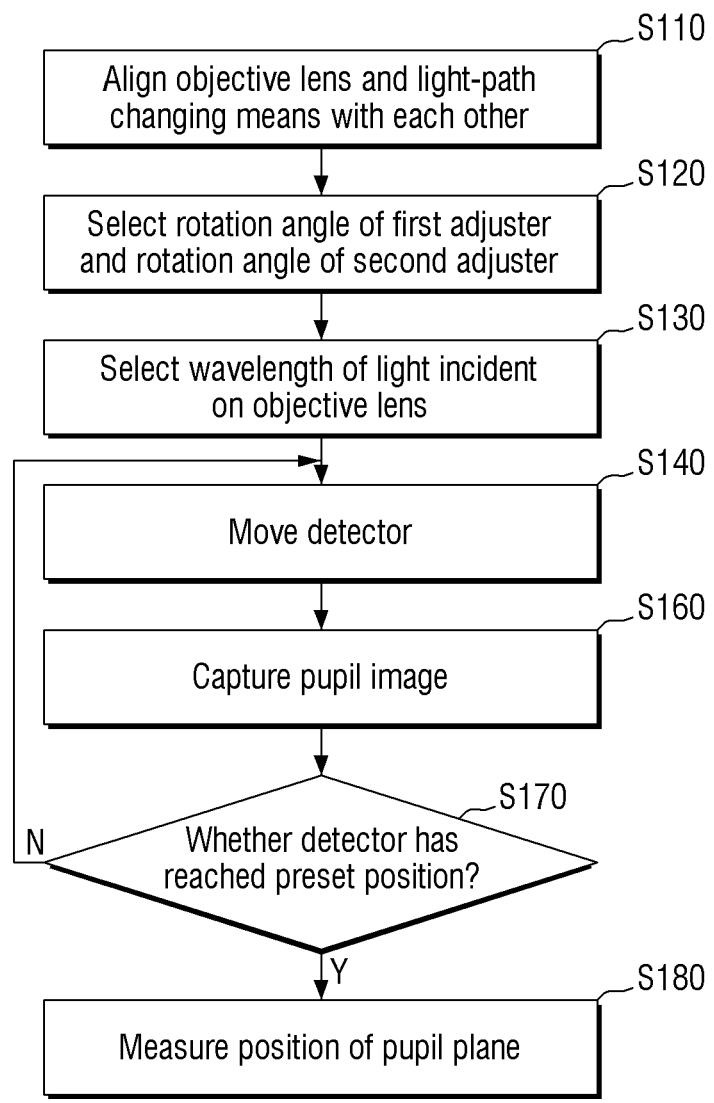
FIG. 7 is a flowchart for illustrating an operation of an optical measurement apparatus according to some embodiments.
Figure 8:
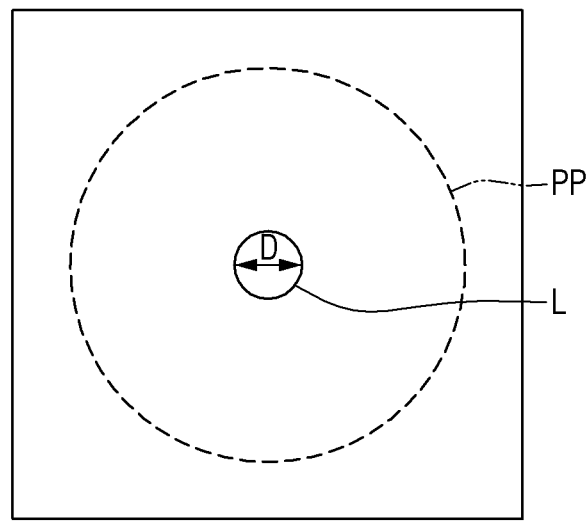
FIG. 8 and FIG. 9 are diagrams for illustrating an operation of an optical measurement apparatus according to some embodiments.
Figure 9:
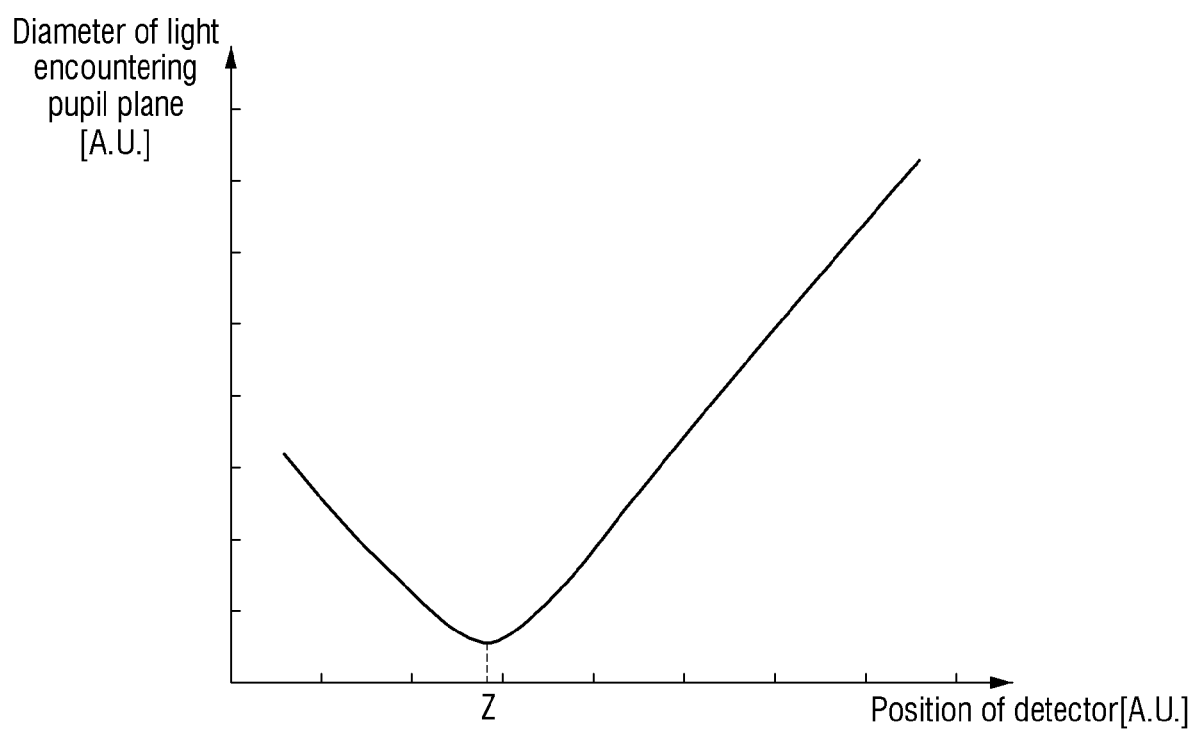

FIG. 7 is a flowchart for illustrating an operation of an optical measurement apparatus according to some embodiments. FIG. 8 and FIG. 9 are diagrams for illustrating an operation of the optical measurement apparatus according to some embodiments.

Referring to FIG. 1, FIG. 2 and FIG. 7, the objective lens 130 and the light-path changing means 120 may be aligned with each other, e.g., in the third direction D3, in S110. The optical axis OA of the objective lens 130 and the rotational axis of the light-path changing means 120 may be aligned with each other. The third adjuster 230 may move the light-path changing means 120 such that the rotation axis of the light-path changing means 120 coincides with the optical axis OA of the objective lens 130.

The light source 110 and the light-path changing means 120 may be in an aligned state with each other without separate operations of the first to third adjusters 210, 220, and 230 due to a structure of each of the first to third adjusters 210, 220, and 230 as shown in the figures and as described above.

A rotation angle of the first adjuster 210 and a rotation angle of the second adjuster 220 may be selected in S120. Accordingly, the incident angle and the azimuth of the light L incident on the objective lens 130 may be selected. The incident angle at which the light L is incident on the objective lens 130 may be calculated based on a rotation speed and a rotation time of the first driver 216. The azimuth of the light L incident on the objective lens 130 may be calculated based on a rotation speed and a rotation time of the second driver 226.

The wavelength of the light L incident on the objective lens 130 may be selected in S130. For example, the wavelength of the light L incident on the objective lens 130 may be selected under an operation of the wavelength selector 150.

An order in which S120 and S130 are performed may vary. S130 may be performed after S120 is performed. Alternatively, S120 may be performed after S130 is performed in certain embodiments.

The fourth adjuster 240 may move the detector 140 in the third direction D3 in S140. The detector 140 may move closer or farther away from the objective lens 130 so that the detector 140 is spaced from the objective lens 130 by a predetermined distance. Accordingly, the distance between the objective lens 130 and the detector 140 may be changed. In another example, the distance between the objective lens 130 and the detector 140 may be changed by moving the objective lens 130 in the third direction D3.

The detector 140 may capture the pupil image in S160.

It may be determined whether the detector 140 has reached a preset position in S170. It may be determined whether the pupil image based on the position of the detector 140 has been captured within a preset search range of position of the detector 140.

In S170, when the detector 140 does not reach the preset position, the process may return to S140. The detector 140 may move again in the third direction D3.

When the detector 140 reaches the preset position in S170, the position of the pupil plane PP may be measured in S180. The controller 250 may measure the position of the pupil plane PP based on the pupil image based on the position of the detector 140.

For example, referring to FIG. 8, a diameter D of the light L which has passed through the objective lens 130 and encounters the pupil plane PP may vary. For example, the diameter D may be a diameter of a cross-section of a light beam in a perpendicular direction to a proceeding direction of the light beam on the pupil plane PP. The controller 250 may measure the position of the pupil plane PP based on the diameter D of the light L encountering the pupil plane PP based on the position of the detector 140. Referring to FIG. 9, the controller 250 may fit a relationship of the diameter D of the light L encountering the pupil plane PP based on the position of the detector 140 from the pupil image based on the position of the detector 140. The controller 250 may measure the position of the pupil plane PP from a position Z of the detector 140 where the diameter D of the light L encountering the pupil plane PP is the smallest.

Figure 10:
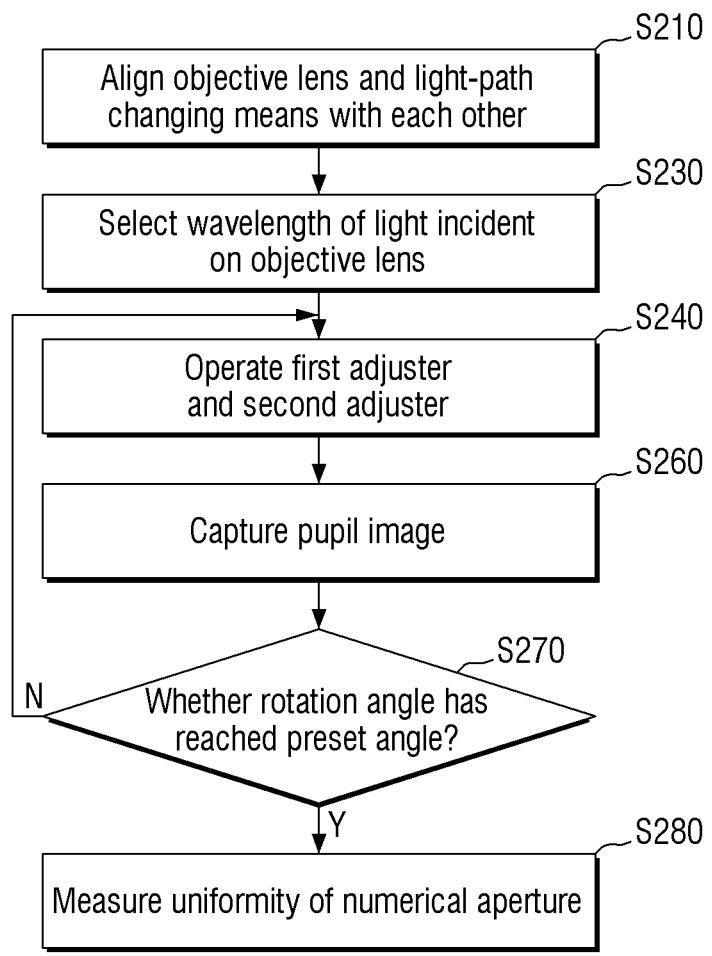
FIG. 10 is a flowchart for illustrating an operation of an optical measurement apparatus according to some embodiments.
Figure 11:
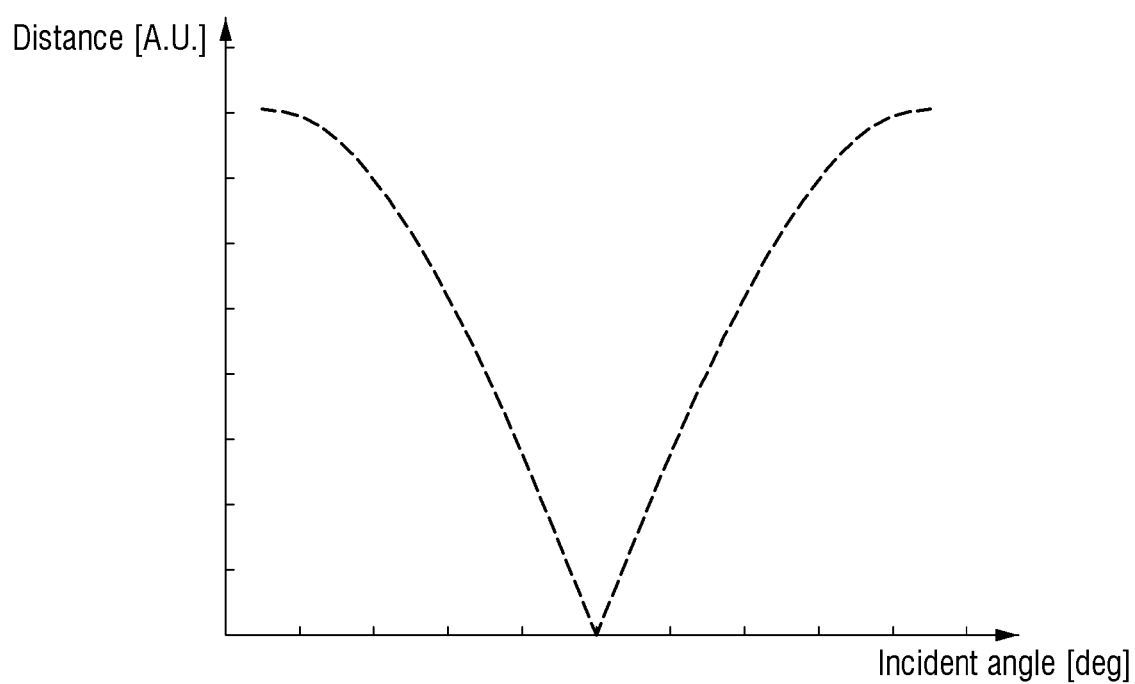
FIG. 11 is a diagram for illustrating an operation of an optical measurement apparatus according to some embodiments.

FIG. 10 is a flowchart for illustrating an operation of an optical measurement apparatus according to some embodiments. FIG. 11 is a diagram for illustrating an operation of an optical measurement apparatus according to some embodiments.

Referring to FIG. 10, the objective lens 130 and the light-path changing means 120 may be aligned with each other, e.g., in the third direction, in S210. The wavelength of the light L incident on the objective lens 130 may be selected in S230. S210 and S230 may be similar to or the same as S110 and S130 of FIG. 7, respectively.

The first adjuster 210 and the second adjuster 220 may operate in S240. Accordingly, the incident angle and the azimuth of the light L incident on the objective lens 130 may be selected.

The detector 140 may capture the pupil image in S260.

It may be determined whether each of the rotation angle of the first adjuster 210 and the rotation angle of the second adjuster 220 has reached a preset angle in S270. It may be determined whether the pupil image based on the rotation angle of the first adjuster 210 has been captured within a preset search range of the rotation angle of the first adjuster 210. It may be determined whether the pupil image based on the rotation angle of the second adjuster 220 has been captured within a preset search range of the rotation angle of the second adjuster 220. The preset search range of the rotation angle of the first adjuster 210 and the preset search range of the rotation angle of the second adjuster 220 may be set independently of each other.

When, in S270, at least one of the rotation angle of the first adjuster 210 and the rotation angle of the second adjuster 220 does not reach the preset angle, the process may return to S240. At least one of the first adjuster 210 and the second adjuster 220 may operate again, e.g., depending on the result of step S270. Accordingly, at least one of the incident angle and the azimuth of the light L incident on the objective lens 130 may be changed.

When, in S270, each of the rotation angle of the first adjuster 210 and the rotation angle of the second adjuster 220 has reached the preset angle, the uniformity of the numerical aperture of the objective lens 130 may be measured based on the pupil image with respect to each of the rotation angle of the first adjuster 210 and the rotation angle of the second adjuster 220 in S280. For example, the controller 250 may measure the uniformity of the numerical aperture of the objective lens 130 based on the pupil image with respect to the incident angle at which the light L is incident on the objective lens 130 and the pupil image with respect to the azimuth of the light L incident on the objective lens 130.

For example, the controller 250 may measure a distance between the light which has passed through the objective lens 130 and encounters the pupil plane PP and a center of the pupil plane PP. Referring to FIG. 11, the controller 250 may fit a relationship of the distance with respect to the incident angle at which the light L is incident on the objective lens 130. Based on the relationship, the controller 250 may measure the uniformity of the numerical aperture according to the incident angle at which the light L is incident on the objective lens 130. Similarly, the controller 250 may measure the uniformity of the numerical aperture with respect to the azimuth of the light L incident on the objective lens 130.

Therefore, the optical measurement apparatus according to some embodiments may measure the uniformity of the numerical aperture with respect to an entire range of each of the incident angle and the azimuth of the light L incident on the objective lens 130. For example, the optical measurement apparatus according to some embodiments may measure the geometrical optical aberration with respect to an entire range of each of the incident angle and the azimuth of the light L incident on the objective lens 130.

Figure 12:
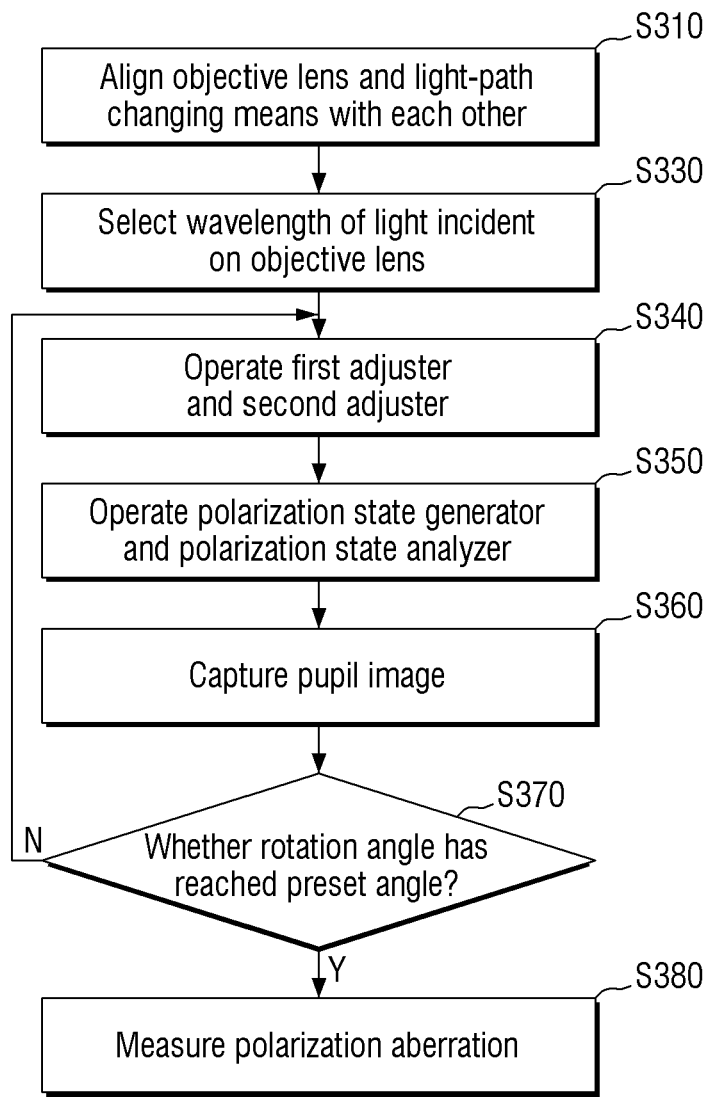
FIG. 12 is a flowchart for illustrating an operation of an optical measurement apparatus according to some embodiments.

FIG. 12 is a flowchart for illustrating an operation of an optical measurement apparatus according to some embodiments.

Referring to FIG. 6 and FIG. 12, the objective lens 130 and the light-path changing means 120 may be aligned with each other, e.g., in the third direction D, in S310. The wavelength of the light L incident on the objective lens 130 may be selected in S330. S310 and S330 may be similar to or the same as S110 and S130 of FIG. 7, respectively.

The first adjuster 210 and the second adjuster 220 may operate in S340. Accordingly, the incident angle and the azimuth of the light L incident on the objective lens 130 may be selected.

The polarization state generator 160 and the polarization state analyzer 170 may operate in S350. The polarization state generator 160 may transform the light incident thereto from the light source 110 into an arbitrary or a predetermined polarization state and may provide resulting light to the light-path changing means 120. The polarization state analyzer 260 may analyze the polarization state of the light reflected from the light-path changing means 120 and may transmit a light beam of a specific polarization state therethrough.

The detector 140 may capture the pupil image in S360.

It may be determined whether each of the rotation angle of the first adjuster 210 and the rotation angle of the second adjuster 220 has reached a preset angle in S370.

When, in S370, each of the rotation angle of the first adjuster 210 and the rotation angle of the second adjuster 220 does not reach the preset angle, the process may return to S340. S370 and S340 may be similar to or the same as S270 and S240 of FIG. 10, respectively.

When, in S370, each of the rotation angle of the first adjuster 210 and the rotation angle of the second adjuster 220 has reached the preset angle, the polarization aberration may be measured based on the pupil image with respect to each of the rotation angle of the first adjuster 210 and the rotation angle of the second adjuster 220 in S380. For example, the controller 250 may measure the polarization aberration with respect to each of the incident angle and the azimuth of the light L incident on the objective lens 130, based on the pupil image with respect to each of the incident angle and the azimuth of the light L incident on the objective lens 130.

For example, the controller 250 may measure a polarization transmittance, a Mueller matrix, a Jones matrix, an incident angle error and an azimuth error of the light encountering the pupil plane with respect to the incident angle of the light L incident on the objective lens 130, and an incident angle error and an azimuth error of the light encountering the pupil plane with respect to the azimuth of the light L incident on the objective lens 130.

The optical measurement apparatus according to some embodiments may measure the polarization aberration with respect to an entire range of each of the incident angle and the azimuth of the light L incident on the objective lens 130. For example, the optical measurement apparatus according to some embodiments may measure the polarization aberration with respect to an entire range of each of the incident angle and the azimuth of the light L incident on the objective lens 130 without limiting to certain ranges of the incident angle and the azimuth of the light L incident on the objective lens 130.

Figure 13:
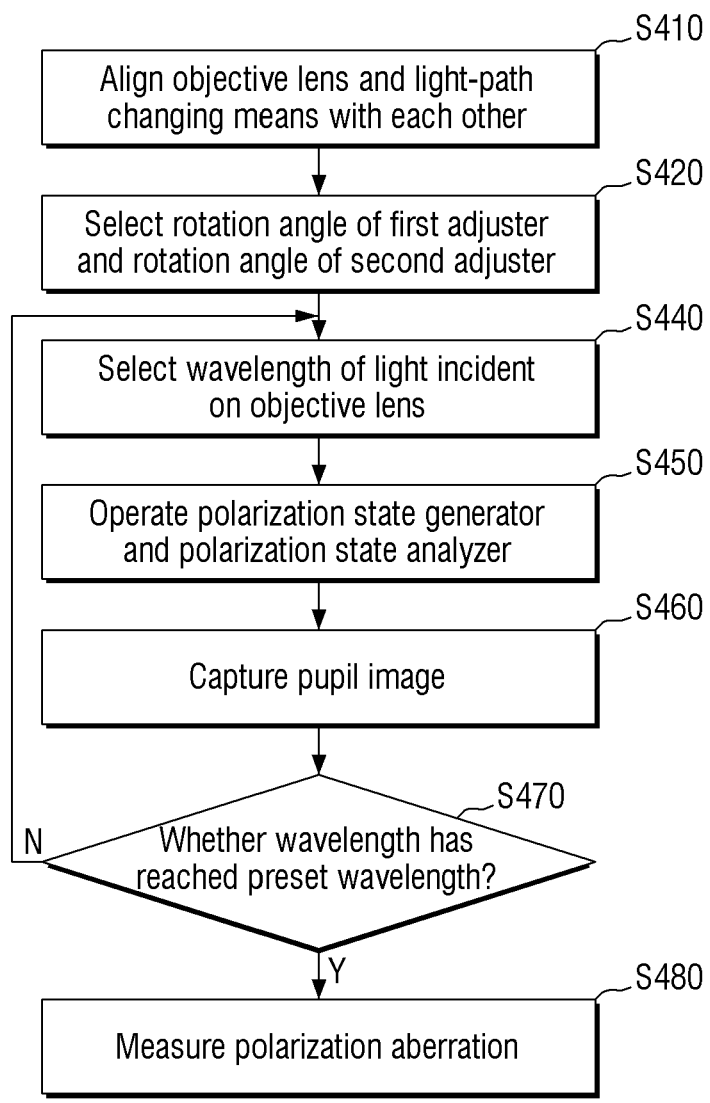
FIG. 13 is a flowchart for illustrating an operation of an optical measurement apparatus according to some embodiments.

FIG. 13 is a flowchart for illustrating an operation of an optical measurement apparatus according to some embodiments.

Referring to FIG. 6 and FIG. 13, the objective lens 130 and the light-path changing means 120 may be aligned with each other, e.g., in the third direction D3, in S410. The rotation angle of the first adjuster 210 and the rotation angle of the second adjuster 220 may be selected in S420. S410 and S420 may be similar to or the same as S110 and S120 of FIG. 7, respectively.

The wavelength of the light L incident on the objective lens 130 may be selected in S440. For example, the wavelength of the light L incident on the objective lens 130 may be selected under an operation of the wavelength selector 150.

The polarization state generator 160 and the polarization state analyzer 260 may operate in S450. S450 may be similar to or the same as S350 in FIG. 12.

The detector 140 may capture the pupil image in S460.

It may be determined whether the wavelength selected by the wavelength selector 150 has reached a preset wavelength in S470. It may be determined whether the pupil image with respect to the wavelength of the light L incident on the objective lens 130 has been captured.

When, in S470, the wavelength selected by the wavelength selector 150 does not reach the preset wavelength, the process may return to S440. Another wavelength may be selected under an operation of the wavelength selector 150. For example, the wavelength of the light L incident on the objective lens 130 may be changed.

When, in S470, the wavelength selected by the wavelength selector 150 has reached the preset wavelength, the polarization aberration may be measured based on the pupil image with respect to the wavelength output from the wavelength selector 150 in S480. For example, the controller 250 may measure the polarization aberration with respect to the wavelength of the light L incident on the objective lens 130, based on the pupil image with respect to the wavelength of the light L incident on the objective lens 130.

For example, the controller 250 may measure the polarization transmittance, the Muller matrix, the Jones matrix, and the incident angle error and the azimuth error of the light encountering the pupil plane PP with respect to the wavelength of the light L incident on the objective lens 130.

The optical measurement apparatus according to some embodiments may measure the polarization aberration with respect to the wavelength of the light L incident on the objective lens 130 without limiting to certain ranges of the incident angle and the azimuth of the light L incident on the objective lens 130.

Even though different figures illustrate variations of exemplary embodiments and different embodiments disclose different features from each other, these figures and embodiments are not necessarily intended to be mutually exclusive from each other. Rather, features depicted in different figures and/or described above in different embodiments can be combined with other features from other figures/embodiments to result in additional variations of embodiments, when taking the figures and related descriptions of embodiments as a whole into consideration. For example, components and/or features of different embodiments described above can be combined with components and/or features of other embodiments interchangeably or additionally to form additional embodiments unless the context clearly indicates otherwise, and the present disclosure includes the additional embodiments.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. An optical measurement apparatus comprising:
    a light source;
    an objective lens;
    a reflector configured to change an optical path of light emitted from the light source such that the light is directed toward the objective lens;
    a detector configured to detect a pupil image;
    a first adjuster configured to rotate the light source around the reflector; and
    a second adjuster configured to rotate the reflector.

2. The optical measurement apparatus of claim 1, wherein the light includes broadband light,
    wherein the optical measurement apparatus further comprises a wavelength selector disposed between the light source and the detector, and
    wherein the wavelength selector is configured to output a monochromatic light beam of the broadband light.

3. The optical measurement apparatus of claim 1, wherein the first adjuster includes a first stage on which the light source is disposed, and a first driver configured to rotate the first stage, and
    wherein the second adjuster includes a second stage on which the reflector is disposed, and a second driver configured to rotate the second stage.

4. The optical measurement apparatus of claim 1, further comprising a third adjuster configured to move vertically along a central axis of the reflector,
    wherein the reflector, the first adjuster and the second adjuster are disposed on the third adjuster.

5. The optical measurement apparatus of claim 1, further comprising:
    a polarization state generator configured to adjust a polarization state of the light directed toward the objective lens; and
    a polarization state analyzer configured to analyze the polarization state of the light passed through the objective lens.

6. The optical measurement apparatus of claim 5, wherein the polarization state generator is disposed between the light source and the reflector, and
    wherein the polarization state analyzer is disposed between the objective lens and the detector.

7. The optical measurement apparatus of claim 5, wherein the light includes broadband light,
    wherein the optical measurement apparatus further comprises a wavelength selector disposed between the light source and the detector, and
    wherein the wavelength selector is configured to output a monochromatic light beam of the broadband light.

8. The optical measurement apparatus of claim 1, further comprising a controller configured to analyze the pupil image based on each of an angle by which the light source has rotated and an angle by which the reflector has rotated.

9. The optical measurement apparatus of claim 1, wherein the reflector is a mirror or a beam splitter.

10. An optical measurement apparatus comprising:
    a light source configured to generate light;
    an objective lens;
    a reflector configured to reflect light emitted from the light source so as to be directed toward the objective lens;
    a detector configured to detect a pupil image;
    a first adjuster configured to adjust an incident angle of the light on the objective lens; and
    a second adjuster configured to adjust an azimuth of the light incident on the objective lens.

11. The optical measurement apparatus of claim 10, wherein the first adjuster rotates the light source around the reflector.

12. The optical measurement apparatus of claim 10, wherein the second adjuster rotates the reflector.

13. The optical measurement apparatus of claim 10, wherein the light includes broadband light,
    wherein the optical measurement apparatus further comprises a wavelength selector disposed between the light source and the detector, and
    wherein the wavelength selector is configured to output a monochromatic light beam of the broadband light.

14. The optical measurement apparatus of claim 10, further comprising a third adjuster configured to adjust a distance between the reflector and the objective lens.

15. The optical measurement apparatus of claim 10, further comprising:
    a polarization state generator configured to adjust a polarization state of the light incident on the objective lens; and
    a polarization state analyzer configured to analyze a polarization state of the light which has passed through the objective lens.

16. The optical measurement apparatus of claim 10, further comprising a controller configured to analyze the pupil image based on each of an incident angle at which the light is incident on the objective lens and an azimuth of the light incident on the objective lens.

17. An optical measurement apparatus comprising:
    a light source;
    a reflector aligned with the light source in a first direction;
    an objective lens aligned with the reflector in a second direction intersecting the first direction; and
    a detector configured to detect a pupil image,
    wherein the light source is rotatable around the reflector as a rotation axis passes through the reflector,
    wherein the reflector is rotatable independently of the light source.

18. The optical measurement apparatus of claim 17, wherein the detector is movable in the second direction.

19. The optical measurement apparatus of claim 17, further comprising:
    a polarization state generator disposed between the light source and the reflector; and
    a polarization state analyzer disposed between the objective lens and the detector.

20. The optical measurement apparatus of claim 17, further comprising a wavelength selector disposed between the light source and the detector,
    wherein the wavelength selector is configured to output a light beam of a specific wavelength of light generated from the light source.

* * * * *